March 9, 1937. F. W. CALDWELL Re. 20,283

PROPELLER

Original Filed May 25, 1929 3 Sheets-Sheet 1

Inventor:
Frank W. Caldwell
By Harris G. Luther
Atty.

March 9, 1937. F. W. CALDWELL Re. 20,283

PROPELLER

Original Filed May 25, 1929 3 Sheets-Sheet 2

Inventor:
Frank W. Caldwell
By Harris G. Ruther
Atty.

March 9, 1937. F. W. CALDWELL Re. 20,283

PROPELLER

Original Filed May 25, 1929 3 Sheets-Sheet 3

Inventor:
Frank W. Caldwell
By Harris G. Luther.
Atty.

Reissued Mar. 9, 1937

Re. 20,283

UNITED STATES PATENT OFFICE 20,283

PROPELLER

Frank W. Caldwell, Hartford, Conn., assignor, by mesne assignments, to United Aircraft Corporation, a corporation of Delaware Original No. 1,893,612, dated January 10, 1933, Serial No. 366,051, May 25, 1929. Application for reissue January 9, 1935, Serial No. 1,029

35 Claims. (Cl. 170—163)

This invention relates to propellers, and more particularly to adjustable pitch propellers adapted for aircraft use.

One object of the invention is the provision of a propeller of the character mentioned, the angle of pitch of the propeller blades being controlled by a simple system, means being provided for increasing the pitch of the blades while the turning effect on the blades caused by centrifugal force is relied on to decrease the blade pitch.

Another object of the invention is the provision of a propeller in which the blade pitch may be controlled by a hydraulic pressure system.

A further object of the invention is the provision of a fluid pressure control system having a piston or fluid pressure responsive member operably connected to the propeller blades for the automatic control of the blade angles in accordance with speed of revolution.

Other objects and advantages of the invention will be apparent from the following description and from the accompanying drawings, in which Fig. 1 is a central section through a propeller, embodying the present invention, the fluid pressure system being diagrammatically illustrated;

Figure 8:
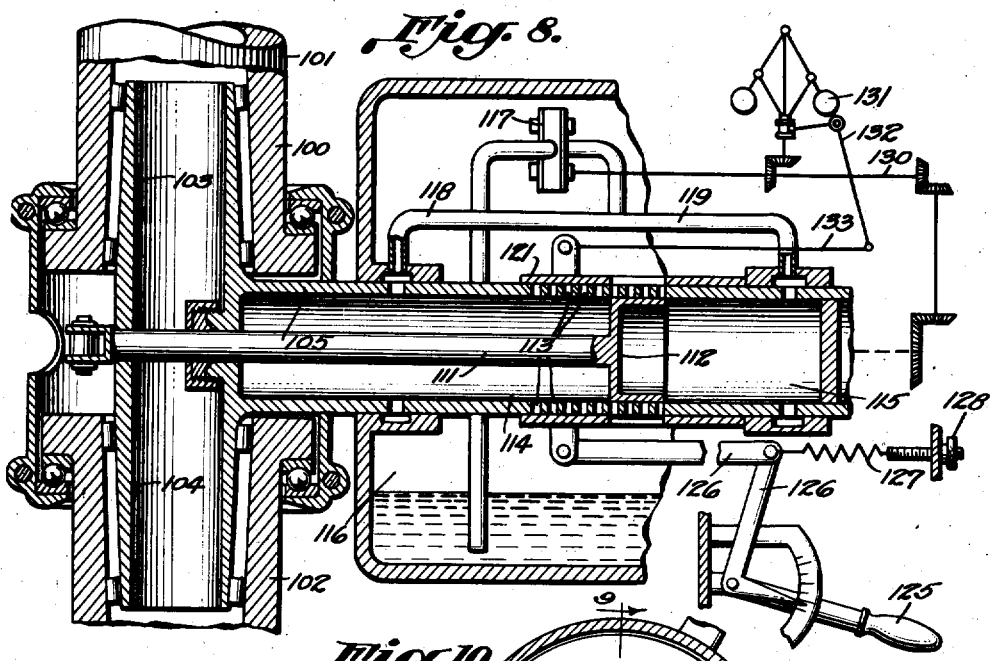
Figure 10:
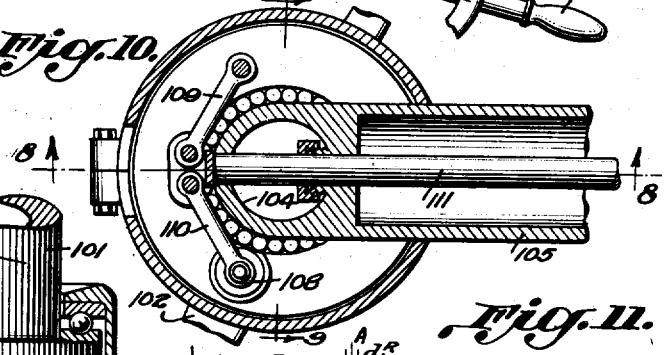
Figure 9:
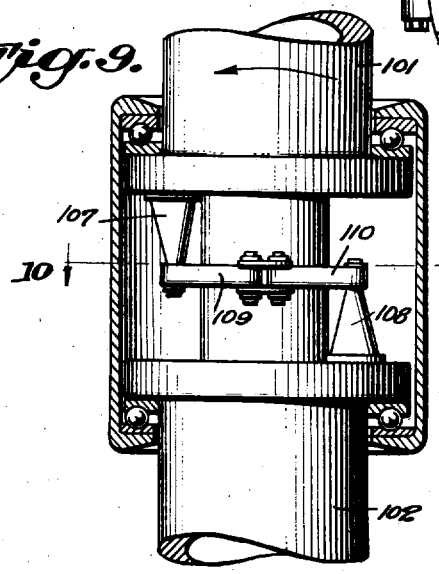
Figure 11:
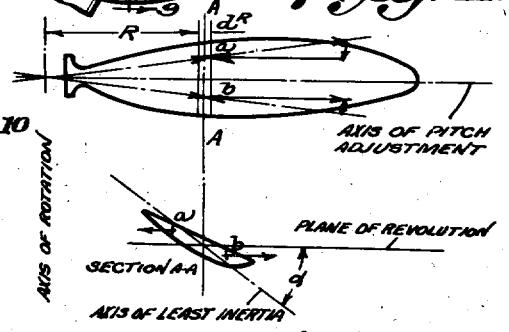

Figs. 8, 9 and 10 show another modification of the invention, Fig. 8 being a central section through a propeller, Fig. 9 being a section on the line 9—9 of Fig. 10, and Fig. 10 being a section on the line 10—10 of Fig. 9;

Fig. 11 is a vector diagram showing how centrifugal force during flight tends to turn the propeller blades to low-pitch position.

Figure 1:
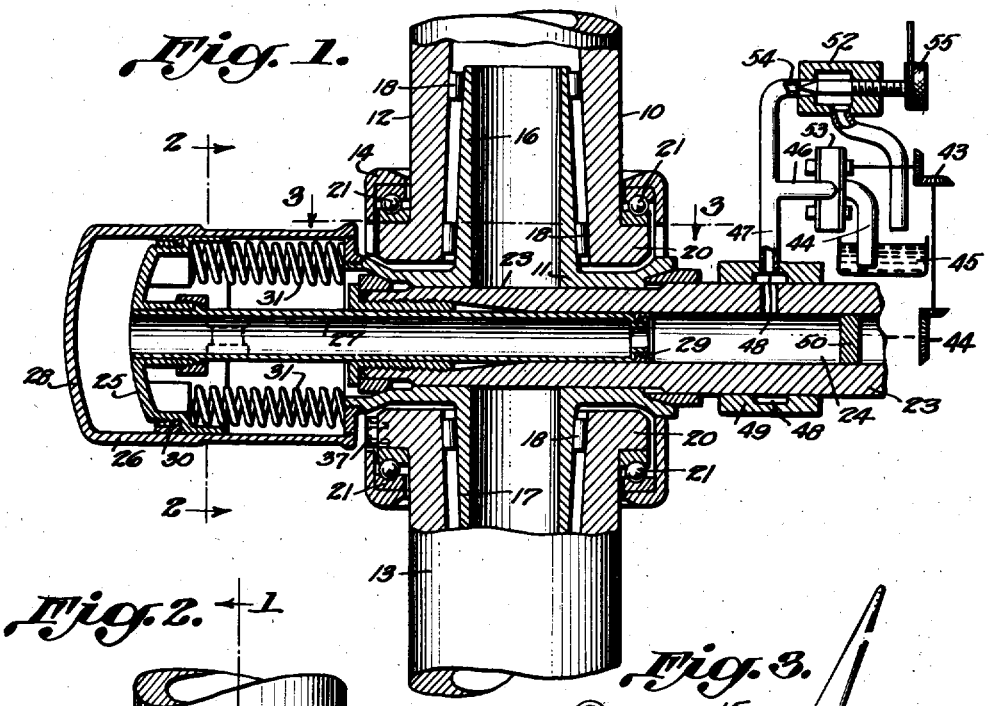
Figure 2:
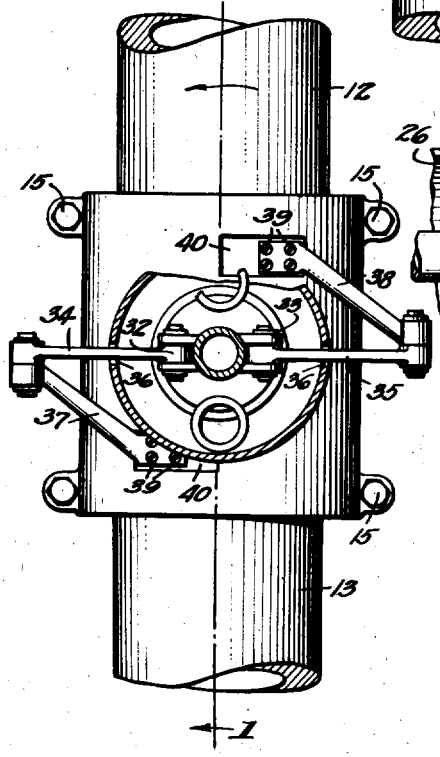
Fig. 2 is a section on the line 2—2 of Fig. 1.
Figure 3:
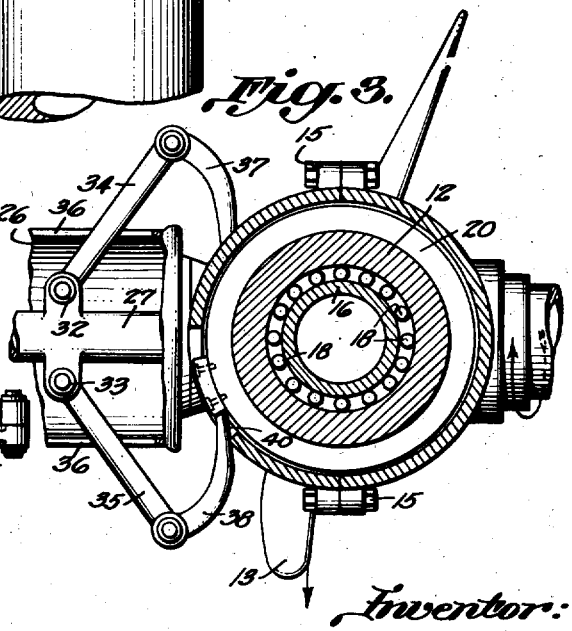
Fig. 3 is a section on the line 3—3 of Fig. 1.

Referring more particularly to the drawings by reference numerals, first with respect to the form of construction shown in Figs. 1 to 3 inclusive, the propeller 10 comprises essentially the hub 11, blades 12 and 13, and the blade retaining device designated generally 14. The blade retaining device is shown in the form of a split clamp, the semicylindrical halves of which are bolted together by the bolts 15, forming a barrel with inturned end flanges so that the hollow roots of the blades are engaged and retained against the action of centrifugal force. The hollow blade roots are mounted on radial hub extensions. The propeller illustrated is of the two bladed type and there are therefore two hub extensions 16 and 17 extending into the hollow blade roots, but it will be understood that any desired number of blades may be provided. Between the blade roots and the hub extensions are suitable bearing members, preferably antifriction roller members 18. There is preferably a set of antifriction rollers adjacent the outer end of each hub projection, and another adjacent the inner end of the blade root, and the hub projection is preferably tapered in cross sectional dimensions as shown. Between the inside flange 20 of each of the blades and the split clamp 14 is a roller member 21, designed to take the radial outward force exerted on the blade in a substantially frictionless manner. The various antifriction members 18 and 21 provide for substantially effortless adjustment of blades about their longitudinal axes, while still serving to hold the blade against movement relatively to the hub in any other direction. The propeller hub 11 is splined or otherwise fixed to the hollow engine driven shaft 23. This shaft 23 may be the usual crank shaft of the engine which drives the propeller.

In accordance with the present invention the blade angles are adjusted during flight preferably in accordance with the speed of the engine. This adjustment of the blade angles is accomplished, as shown, by a hydraulic pressure system, comprising the hollow propeller shaft 23 containing a quantity of oil or other liquid 24. The pressure of this oil is controlled automatically and may also be controlled manually in a manner to be presently described. The pressure of the oil is effective on a pressure responsive element, preferably a piston 25, operating in a cylinder 26, shown at the forward end of the propeller shaft. The piston 25 is fixed to the end of a piston operated member or tube 27 which is slidably mounted within the hollow propeller shaft, and which is open at its ends so that the space between the piston 25 and the cylinder head 28 is maintained in constant communication with the oil in the hollow shaft 23. Leakage around the outside of the tube 27 may be prevented by a suitable packing or washer 29, and packing material 30 is also provided between the piston 25 and the cylinder 26.

The piston 25 is yieldingly urged outwardly by a series of compression springs 31 extending between the piston 25 and the inner end of the cylinder 26. The force exerted by these springs, however, is very small as compared to the outward force on the piston produced by the axial turning tendency of the blades caused by centrifugal force, and which constantly tends to cause a decrease in the pitch of the blades. This centrifugal force effect or tendency of the blades to reduce their pitch is proportional to the difference of the moments of inertia about the two principal axes of the cross section. It is also proportional to the square of the rotational speed and to the density of the material. This centrifual force effect is relied upon to decrease the blade pitch, increase in pitch being caused by increase in the fluid pressure acting on the piston shown in Fig. 1. This arrangement provides a very simple pitch controlling mechanism.

Centrifugal force acts radially through the axis of revolution. See Fig. 11. Considering the force acting on small particles at *a* and *b* this force may be resolved into a vector parallel to the axis of pitch adjustment, and one normal to the axis of pitch adjustment. The vector parallel to this axis of the pitch adjustment cannot cause torsion about this axis. If the vectors normal to the axis of pitch adjustment are transferred to a sectional view at A—A it will be obvious that they will tend to decrease the pitch of the blade. It may be shown mathematically that this force is equal to $\delta/gW^2$ (I *maj.*—I *min.*) sin $\alpha$ cos $\alpha d^R$. Where $\delta$ is the density of the material in weights units, $g$ the acceleration due to gravity, I *maj.* and I *min.* the principal moments of inertia of the cross section, and $\alpha$ the angle between the plane of rotation and the axis of least inertia. If his quantity is integrated for the full length of the blade it may be shown that the resultant twisting moment is of a considerable magnitude. It has a value between 2000 pounds inches and 3000 pounds inches per blade for a number of propellers of usual sizes and speeds.

When the pitch of the propeller in operation is not changed by force of the hydraulically driven piston, it is held by centrifugal force in the lowest pitch position that it can assume. This may be called its normal pitch, because that is the pitch the blades have except as purposely changed by the pilot through force of the hydraulic cylinder.

On the piston operated member 27 are two lugs 32 and 33 to which are pivotally connected links 34 and 35 respectively. These links extend out through suitable slots 36 in the cylinder 26 and in turn are pivoted to arms 37 and 38 each of which is connected to the flanged inner end of a propeller blade. The arms 37 and 38 as shown are fixed directly to the blade flange by means of screws 39 or the like, the split clamp being cut away or slotted in such a way as to provide for the pitch adjusting arms mentioned, these slots being indicated at 40.

The arrangement of the link connection between the reciprocally operable control member or piston and the blades is a simple but very desirable form of interconnection, as the arms 37 and 38 and the links 34 and 35 provide what might be termed toggles so arranged as to produce very small angular movements of the blades about the blade axes upon substantial range of movement of the piston tube. This gives the piston a considerable leverage and permits the use of moderate oil pressures with a comparatively small piston area. A further advantage of this linkage is that the sliding members are not subjected to side loads, the heavy loads being applied on the pivots of the links so that the operating friction is reduced to a minimum.

It will now be apparent that when the piston operated member or tube 27 is moved in the direction of its length, the lugs 32 and 33 will be moved closer to or farther from the propeller blades, thus shifting both blades to simultaneously increase or decrease their pitch. When the tube 27 is moved inwardly by the increase of pressure of the oil in the system, the pitch of the blades is increased. The oil pressure is opposed by the springs 31, and also by the large centrifugal force on the blades themselves tending to decrease their angles of incidence, the cross section of the blades being so designed that the centrifugal turning tendency of the blades to reduce their pitch is very substantial.

The fluid pressure in the fluid system is generated preferably by an engine driven pump. As shown in Fig. 1 this pump 53 is connected by suitable gearing 43 to an engine driven gear 44 which may be fixed on the shaft 23. The pump is of the intermeshing gear type for example, and is supplied with oil through a supply conduit 44' which leads to the sump of the engine crank case, this sump being designated diagrammatically at 45. The engine oil forced out of the pump flows through the pipe 46 to pipe 47 which is in constant communication with the inside of the shaft 23. Preferably the latter is provided with a series of openings communicating with an annular supply passage 48 in the packing part 49. As shown, the oil chamber in the engine shaft 23 is closed at 50.

Connected with the pipe 46 is a relief valve 52 adapted to return the oil passing through the pump 53 through a variable valve restriction 54 to the engine sump. The size of the opening at 54 is controlled by a suitable adjustable screw 55 or the like. When this screw 55 is in such a position as to considerably restrict the size of the opening 54, the pressure on the output side of the pump is increased. This causes the piston tube to be forced inwardly thus moving the propeller blades about their longitudinal axes and increasing their pitch.

For a given setting of the by-pass the oil pressure will be nearly proportionate to the square of the engine speed and the centrifugal twisting moments on the blades will be proportional to the square of the engine speed so that these two opposing forces will just about balance at various engine speeds unless the restriction of the orifice is altered.

An increase in pitch of the blades causes the engine to do more work and consequently decreases the speed of the engine. The engine speed and the pitch of tne propeller blades may be manually controlled, and these factors are also automatically controlled in such a way as to normally maintain the engine speed substantially constant where it can operate at its most efficient speed, the pitch of the blades varying as the speed of the airplane changes. For example the screw 55 may be connected by a suitable cable to a fly ball governor or the like responsive to the speed of the engine. The engine being directly connected to the propeller operates at the propeller speed, so when the airplane increases its speed, by diving for example, the load on the engine would be decreased and it would speed up, possibly to an injurious high speed were it not for the automatic control herein provided. In accordance with the present invention should the airplane dive and the load on the engine tend to fall off, the engine tends to increase its speed; that increases the pressure of the oil on the outlet side of the pump and the automatic operation of the screw 55 by the fly ball governor causes a restriction in the by-pass and a further increase in oil pressure. The piston tube therefore is forced to the right, the pitch of the blades is increased, thus increasing the load on the engine. The engine speed therefore is maintained substantially constant during the various maneuvers of the airplane unless it is desired to manually effect the control of the engine speed. The proper engine speed for any particular circumstance may be chosen, and the blade angles automatically controlled so that both the engine and the propeller operate at their maximum efficiencies.

The form of construction shown in Figs. 4 to 7 inclusive is generally similar to the device which has just been described. The hollow engine shaft 60 forms a support for the propeller hub 61 on which are mounted the blades 62 and 63 in a manner similar to the propeller construction previously described. The fluid pressure element or piston, in this case, is shown adapted for operation within the hollow shaft 60, piston 64 being connected to the piston operated member 65 which is pivotally connected to the two links 67 and 68 at its forward end which extends through a packing bushing 66. These two links 67 and 68 in turn are pivotally connected to arms 69 and 70 fixed to the inner flanged portions of the blades. As the pressure on the oil supply 71 at the rear of the piston 64 increases, the piston and its operated member 65 move to the left as viewed in Figs. 4 and 6, thus swinging the arms 69 and 70 and adjusting the pitch of the propeller blades to increase their pitch equal amounts. When the fluid pressure falls the centrifugal force acting on the blades themselves returns the blades towards minimum pitch positions to an extent determined by the fluid pressure.

Figure 4:
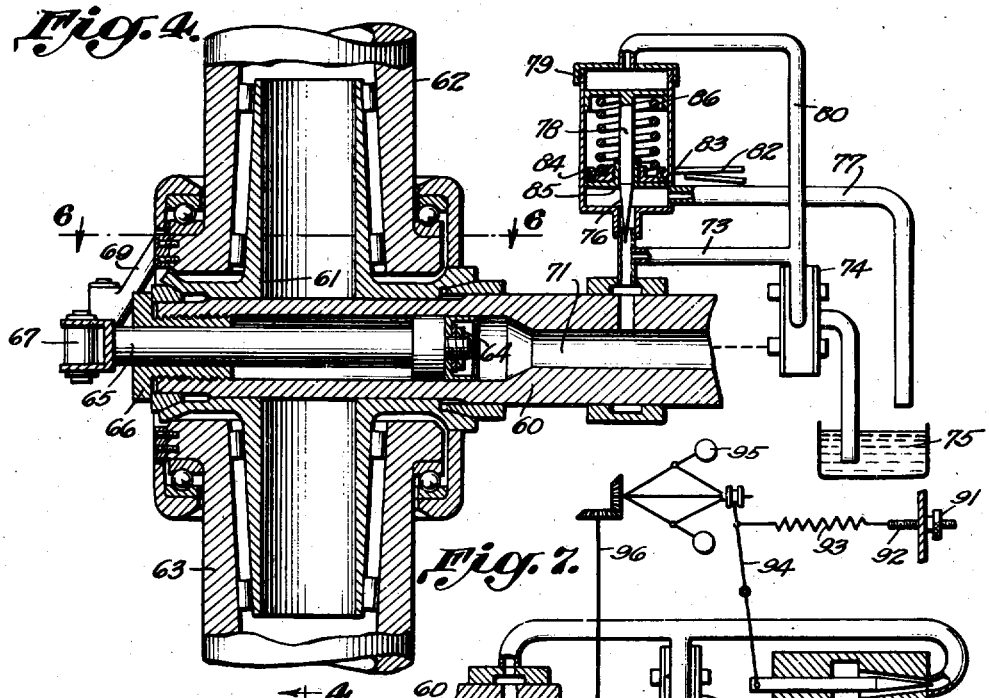
Figs. 4 to 7 show a modified form of the invention, Fig. 4 being a central section through a propeller, Fig. 5 showing a front elevation, Fig. 6 being a section on the line 6—6 of Fig. 4 and Fig. 7 being a part diagrammatic showing of a control system.

The oil or other fluid 71 is supplied to the inside of the hollow shaft 60 through a supply passage 73 extending from the oil pump 74 which may be directly connected to the engine shaft 60 as indicated in Fig. 4. Oil is supplied from the engine sump 75 and is forced by the pump 74 to the shaft 60, some of the oil by-passing the valve 76 and returning through the passage 77 to the sump. The amount of opening of the valve 76 is determined by a valve needle suitably fixed to a piston 78 contained in the cylinder 79, the upper side of the piston being in communication with the outlet side of the pump through pipe 80. As the pressure on the outlet side of the pump increases the valve controlling piston 78 is forced down against the adjustable spring to restrict the opening 76 and thus cause an increase in the pressure of the fluid supplied to the hollow shaft 60. It will be apparent that as the by-pass is restricted, the fluid pressure on the piston 64 is increased, and this causes an increase in pitch of the propeller blades. This increase in pitch of the propeller blades by throwing more load on the engine serves to maintain the engine speed substantially constant through various maneuvers of the airplane.

When it is desired to manually check the speed of the engine, or change the angle of the propeller blades, the setting of the valve 76 may be manually affected by operation of the control cable 82 extending to the pilot's cockpit, this cable passing into the valve case at 83 and extending around an operating pulley 84 threaded on the screw 85 and forming an abutment for one end of the spring 86 which balances the pressure on the upper side of the controlling piston 78. The variation in the pressure of the spring 86 may therefore be manually controlled to effect the control of the fluid pressure in the system.

Figure 7:
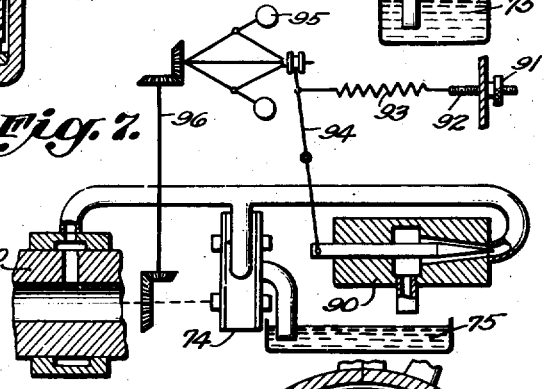
Figure 5:
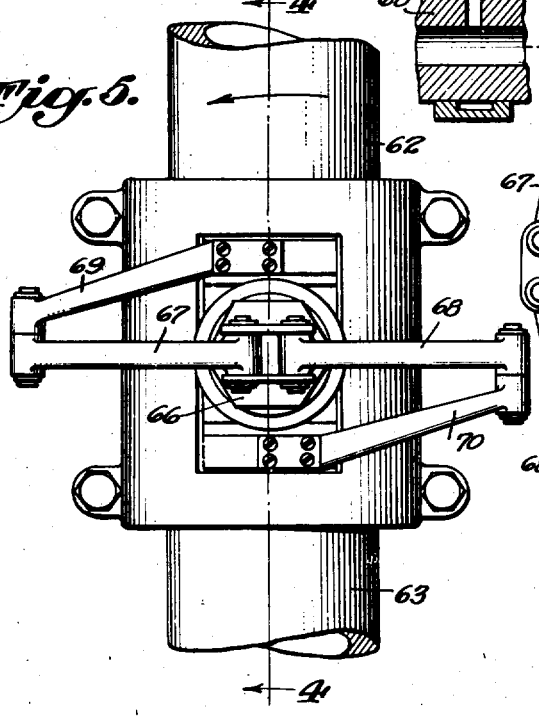
Figure 6:
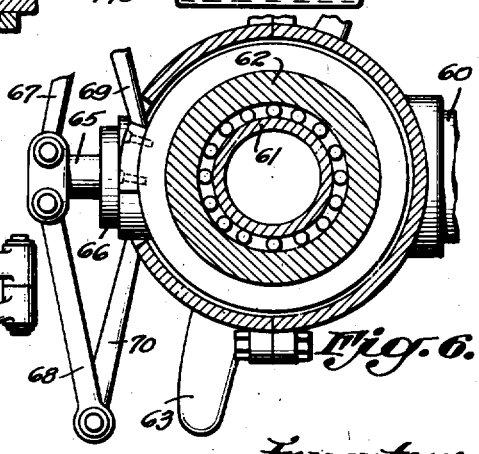

The by-pass valve shown in Fig. 4 may be replaced as shown in Fig. 7 by a controllable valve 90 which is adapted to be controlled by a manually operable thumb screw 91 in threaded engagement with the longitudinally adjustable screw 92 fixed to the extension spring 93. This spring is connected to a pivoted lever 94, the spring pressure being balanced against the centrifugal action of the fly ball governor 95 which is operably connected to the engine by suitable gearing 96. The fly ball governor operates to maintain a substantially constant engine speed for any particular setting of the thumb screw 91, causing the adjustment of the blade angles in an automatic manner during various maneuvers of the airplane. The manual adjustment at 91 permits variation of the engine speed as desired and forms a manual control which modifies the automatic control.

As shown in Figs. 8, 9 and 10, the propeller 100 embodies the blades 101 and 102 rotatably mounted on the radial hub projections 103 and 104 respectively in the manner generally similar to the forms of construction previously described. The radial hub projections 103 and 104 instead of projecting from a hollow hub member, are formed as outward radial extensions on the engine operated shaft 105.

Projecting inwardly from the flanged ends of the blades 101 and 102 are posts 107 and 108, the inner ends of which are pivotally connected to operating arms 109 and 110 respectively. These arms are pivoted to the outer end of a piston operated rod 111 controlled by the fluid pressure responsive member or piston 112. The latter operates in a cylinder formed by the hollow engine shaft 105, and this cylinder is provided with a series of relief passages 113 through which the oil in the chambers 114 and 115 on opposite sides of the piston may be relieved and return to the engine sump 116. Oil is pumped from this sump by the pump 117, and the outlet side of the pump is connected to the two pipe branches 118 and 119 extending to the chambers or spaces 114 and 115 in the engine shaft. Embracing the vented portion of the shaft 105 is a sleeve valve 121 having a cut-away portion 122 of a width approximately the same as the width of the piston 112 so that the sleeve 121 together with a piston 112 can close all of the valve openings 113 when the system is in stable equilibrium. If the valve 121 is moved to the left as viewed in Fig. 8 the oil pressure in the chamber 114 reduces, the oil flowing out of this chamber through one or more openings 113 which are uncovered at the time by the sleeve 121. Oil tends to flow from the pump into the chamber 115 on the opposite side of the piston to force the piston 112 to the left and again cover up the passage 113 which was opened. This occurs until the piston 112 has been moved far enough to the left to stabilize the system again and equalize the pressures on opposite sides of the piston for the new setting of the valve sleeve, the movements of the piston controlling the adjustment of the blades which are increased in pitch as the sleeve 121 is moved to the left.

The sleeve 121 may be controlled both automatically and manually. As shown, the manual control may include a manually operable lever 125 directly connected to the sleeve by suitable arms and links 126 or the like. Preferably a spring 127 having an adjustment nut 128 tends to hold the sleeve 121 in the position shown in Fig. 8 corresponding to the minimum pitch position of the propeller blades. The pump shaft 130 which is driven from the engine shaft 105 controls a fly ball governor 131 which automatically affects the position of the bell crank lever 132 connected by link 133 to the sleeve 121. If the engine speed tends to increase, the link 133 is automatically moved to the left, thus causing a movement of the piston rod 111 to the left to effect an increase in pitch of the propeller blades. As this tends to increase the load on the engine it will be apparent that the engine is automatically controlled so that its speed is normally maintained substantially constant during various airplane maneuvers. The automatic control may be overcome in a manual manner whenever desired by operation of the lever 125 so that the speed of the motor can be adjusted to the desired value for any special occasion.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. An aeronautical controllable pitch propeller, comprising a hub, blades mounted thereon rotatable on their longitudinal axes but otherwise immovable relative to the hub, a drive shaft carrying the hub and having an axial bore, a source of hydraulic pressure in communication with the bore, an enlarged cylinder mounted on the hub and extended beyond the forward end of the engine shaft, and positioned beyond the blades, a piston in the cylinder having a tubular extension slidably fitted in the engine shaft bore and opening through the piston, the walls of the cylinder near its base having diametrically disposed longitudinal slots, links pivotally connected to the piston extending through said slots and pivotally connected to arms laterally extending from the roots of the blades whereby to rotate the blades on their longitudinal axes to increase their pitch, and means to control hydraulic pressure in the cylinder and so to control increase of pitch due to movement of the piston.

2. An aeronautical controllable pitch propeller, comprising a hub, blades mounted thereon rotatable on their longitudinal axes but otherwise immovable relative to the hub, a drive shaft carrying the hub and having an axial bore, a source of hydraulic pressure in communication with the bore, an enlarged cylinder mounted on the hub and extended beyond the forward end of the engine shaft, and positioned beyond the blades, a piston in the cylinder having a tubular extension slidably fitted in the engine shaft bore and opening through the piston, the walls of the cylinder near its base having diametrically disposed longitudinal slots, links pivotally connected to the piston extending through said slots and pivotally connected to arms laterally extending from the roots of the blades whereby to rotate the blades on their longitudinal axes to increase their pitch, springs in the cylinder opposing movement of the piston by hydraulic pressure but adapted to be overcome thereby to a degree depending on the hydraulic pressure applied to the cylinder, and means to control hydraulic pressure in the cylinder and so to control increase of pitch due to movement of the piston.

3. An aeronautical controllable pitch propeller, comprising a hub, blades mounted thereon rotatable on their longitudinal axes but otherwise immovable relative to the hub, a drive shaft carrying the hub and having an axial bore, a source of hydraulic pressure in communication with the bore, an enlarged cylinder mounted on the hub and extended beyond the forward end of the engine shaft, a piston in the cylinder having a tubular extension slidably fitted in the engine shaft bore and opening beyond the piston, the walls of the cylinder near its base having diametrically disposed longitudinal slots, toggle links pivotally connected to the piston extending through said slots and pivotally connected to arms laterally extending from the roots of the blades, and hand-operated means to control hydraulic pressure in the cylinder to increase the pitch of the blades.

4. An aeronautical controllable pitch propeller, comprising a hub, blades mounted thereon rotatable on their longitudinal axes but otherwise immovable relative to the hub, a drive shaft carrying the hub and having an axial bore, a source of hydraulic pressure in communication with the bore, an enlarged cylinder mounted on the hub and extended beyond the forward end of the engine shaft, a piston in the cylinder having a tubular extension slidably fitted in the engine shaft bore and opening beyond the piston, the walls of the cylinder near its base having diametrically disposed longitudinal slots, toggle links pivotally connected to the piston extending through said slots and pivotally connected to arms laterally extending from the roots of the blades, springs in the cylinder opposing movement of the piston by hydraulic pressure but adapted to be overcome thereby to a degree depending on the hydraulic pressure applied to the cylinder, and hand-operated means to control hydraulic pressure in the cylinder to increase the pitch of the blades.

5. An aeronautical variable pitch propeller and control mechanism therefor, comprising a hub, blades mounted thereon rotatable on their longitudinal axes but otherwise immovable relative to the hub, an engine drive shaft carrying the hub and having an axial bore, a source of hydraulic pressure in communication with the bore, an enlarged cylinder mounted on the hub and extended beyond the forward end of the engine shaft, a piston in the cylinder having a tubular extension slidably fitted in the engine shaft bore and opening through the piston, the walls of the cylinder near its base having diametrically disposed longitudinal slots, links pivotally connected to the piston extending through said slots and pivotally connected to arms laterally extending from the roots of the blades, and automatic means governed by speed of rotation of the shaft to increase the hydraulic pressure in the cylinder with increase of shaft speed.

6. An aeronautical variable pitch propeller and control mechanism therefor, comprising a hub, blades mounted thereon rotatable on their longitudinal axes but otherwise immovable relative to the hub, an engine drive shaft carrying the hub and having an axial bore, a source of hydraulic pressure in communication with the bore, an enlarged cylinder mounted on the hub and extended beyond the forward end of the engine shaft, a piston in the cylinder having a tubular extension slidably fitted in the engine shaft bore and opening through the piston, the walls of the cylinder near its base having diametrically disposed longitudinal slots, links pivotally connected to the piston extending through said slots and pivotally connected to arms laterally extending from the roots of the blades, springs in the cylinder opposing movement of the piston by hydraulic pressure but adapted to be overcome thereby to a degree depending on the hydraulic pressure applied to the cylinder, and automatic means governed by speed of rotation of the shaft to increase the hydraulic pressure in the cylinder with increase of shaft speed.

7. An aeronautical propeller and mechanism for increasing its pitch in flight, comprising a hub, blades mounted thereon rotatable on their longitudinal axes but otherwise immovable relative to the hub, an engine drive shaft carrying the hub and having an axial bore, a source of hydraulic pressure in communication with the bore, an enlarged cylinder mounted on the hub and extended beyond the forward end of the drive shaft, a piston in the cylinder having a tubular extension slidably fitted in the shaft bore and opening through the piston, the walls of the cylinder near its base having diametrically disposed longitudinal slots, toggle links pivotally connected to the piston extending through said slots and pivotally connected to arms laterally extending from the roots of the blades, automatic means governed by speed of rotation of the shaft to increase the hydraulic pressure in the cylinder with increase of shaft speed, and hand operated means to control hydraulic pressure in the cylinder independently of and in spite of the automatic governing control thereof.

8. An aeronautical propeller and mechanism for increasing its pitch in flight, comprising a hub, blades mounted thereon rotatable on their longitudinal axes but otherwise immovable relative to the hub, an engine drive shaft carrying the hub and having an axial bore, a source of hydraulic pressure in communication with the bore, an enlarged cylinder mounted on the hub and extended beyond the forward end of the drive shaft, a piston in the cylinder having a tubular extension slidably fitted in the shaft bore, and opening through the piston, the walls of the cylinder near its base having diametrically disposed longitudinal slots, toggle links pivotally connected to the piston extending through said slots and pivotally connected to arms laterally extending from the roots of the blades, springs in the cylinder opposing movement of the piston by hydraulic pressure but adapted to be overcome thereby to a degree depending on the hydraulic pressure applied to the cylinder, automatic means governed by speed of rotation of the shaft to increase the hydraulic pressure in the cylinder with increase of shaft speed, and hand operated means to control hydraulic pressure in the cylinder independently of and in spite of the automatic governing control thereof.

9. An aeronautical propeller adapted to have its blades held in normal low-pitch position by centrifugal force acting on the mass of the blades, and controllable means to increase the pitch of the blades in flight, said means comprising a fluid pressure system including a pump driven by the engine, a drive shaft, a hub on the drive shaft, blades mounted on the hub and adapted to be rotated thereon to adjust their pitch, the shaft having a cylindrical bore at its forward end closed by a terminal nut, a piston slidably mounted in the bore, a rigid stem extending through the nut from the piston, toggle links pivotally attached to the forward end of the stem, the links being operatively connected to the blades, whereby to increase the pitch of the blades upon forward driving of the piston by hydraulic pressure in the cylinder.

10. A variable-pitch propeller having a normal low-pitch and adapted to have its pitch increased in flight by hydraulically-operated control means, comprising blades with hollow flanged roots, a hollow drive shaft carrying radial hub projections at its forward end adapted to receive the blade roots, a split internally flanged barrel engaging the said flanges for holding the blades on the hub projections, a piston mounted in the hollow shaft, a rod extending forward from the piston, toggle links connecting the forward end of the rod to the roots of the blades whereby forced travel of the piston causes rotation of the blades on their longitudinal axes, a source of hydraulic pressure connected to the cylinder, and means to control the pressure in the cylinder and thereby to vary the pitch of the propeller in flight.

11. A controllable pitch aeronautical propeller comprising a hollow drive shaft forming a pressure cylinder at its forward end, lateral integral hub projections from the forward end of the cylinder, blades mounted on the projections and adapted to be rotated on their longitudinal axes for pitch adjustment in flight, a piston mounted in the pressure cylinder, a rod extending from the piston through the forward end of the pressure cylinder and linked to crank arms on the blade roots, a source of hydraulic pressure connected to each end of the pressure cylinder, escape vents in the cylinder wall, and a slidable external valve surrounding the drive shaft and controlling the escape vents to determine a balanced position of the piston in the cylinder, whereby to control the pitch of the blades in flight by position of said valve.

12. A controllable pitch aeronautical propeller comprising a hollow drive shaft forming an integral pressure cylinder at its forward end, a hub carried on the shaft, blades mounted in the hub and rotatable therein on their longitudinal axes, a piston mounted in the pressure cylinder, a rod extending from the piston through the forward end of the pressure cylinder, links connecting the rod to crank arms on the blade roots, a source of hydraulic pressure connected to each end of the pressure cylinder, escape vents in the cylinder wall, a slidable external valve controlling the escape vents and so determining the position of the piston in the cylinder, and manually-operable means to shift the valve at will, whereby to control the pitch of the blades in flight.

13. A controllable pitch aeronautical propeller comprising a hollow drive shaft forming a pressure cylinder at its forward end, lateral integral hub projections from the forward end of the cylinder, blades with hollow roots mounted on the projections, the blades having external terminal flanges, a split barrel with inturned end flanges enclosing the flanged roots of the blades and retaining them against longitudinal movement, anti-friction bearings between the blades and the hub projections and between the blades and the barrel, a piston mounted in the pressure cylinder, a rod extending from the piston through the forward end of the pressure cylinder, links connecting the rod to crank arms on the blade roots, a source of hydraulic pressure connected to each end of the pressure cylinder, escape vents in the cylinder wall, and a slidable external valve controlling the escape vents and so providing a balanced position of the piston in the cylinder whereby to determine the pitch of the blades.

14. A controllable pitch aeronautical propeller having a normal low-pitch adapted to be increased in flight, comprising a hollow drive shaft forming an integral pressure cylinder at its forward end, lateral hub projections at the forward end of the cylinder, blades with hollow roots mounted on the projections, the blade roots having external terminal flanges, a split barrel with inturned end flanges enclosing the flanged roots of the blades and retaining them against longitudinal movement, anti-friction bearings between the blades and the hub projections and between the blade flanges and the barrel flanges, a piston mounted in the pressure cylinder, a rod extending from the piston through the forward end of the pressure cylinder, links connecting the rod to projections on the blade roots whereby to change the pitch of the blades when the piston is moved, a source of hydraulic pressure connected to each end of the pressure cylinder, escape vents in the cylinder wall, and a slidable external valve controlling the escape vents and adapted to provide a balanced intermediate position of the piston in the cylinder and so to control the pitch of the blades.

15. A variable-pitch propeller, having a normal low-pitch and adapted to have its pitch increased in flight by hydraulically-operated control means, comprising blades with hollow flanged roots, a hollow engine shaft having hollow integral radial hub projections at its forward end adapted to receive the blade roots, external means engaging the said flanges for holding the blades on the hub projections, a piston slidably mounted in an axial bore in the engine shaft, a rod extending forward from the piston through the end of the shaft, links extending from the forward end of the rod to extensions from the roots of the blades whereby forced travel of the piston causes rotation of the blades on their longitudinal axes, a source of hydraulic pressure connected to the cylinder on each side of the piston, relief vents through the cylinder walls, a sleeve valve surrounding the vented portion of the cylinder and adapted to be moved to control the said vents to determine a balanced position of the piston in the cylinder and so to control the pitch adjustment of the blades.

16. An aeronautical propeller comprising a drive shaft having a bore therein, a source of hydraulic pressure connected to the bore, a hub fixed on the drive shaft and comprising lateral radial blade-receiving projections, blades having hollow flanged roots adapted to fit over the hub projections and to be rotatably mounted thereon, a split barrel having inturned end flanges adapted to enclose the blade root flanges and hold the blades against longitudinal displacement, a pressure cylinder aligned with and connected to the bore of the drive shaft, a movable piston in the cylinder, toggle connections from the piston extending forward of the hub to the blades whereby to turn the blades on the hub projections upon actuation of the piston, and means to control fluid pressure in the cylinder whereby to drive the piston to increase the pitch of the blades while in operation.

17. A controllable pitch propeller comprising a hub, blades journalled on the hub and constructed and arranged so that they will be turned in the direction to decrease their pitch angle by centrifugal force produced by rotation of the propeller, a piston, means connecting the piston to the blades, and means for introducing liquid under pressure, onto one side of said piston, to overcome the pitch changing action of centrifugal force on said blades and turn the blades to increase their pitch angle.

18. A controllable pitch propeller comprising a hub, blades journalled relative to said hub, a hydraulic piston operatively connected with said blades, means for introducing hydraulic pressure onto one side of said piston to turn the blades on their journals to increase their pitch angles, means for relieving said hydraulic pressure, means including said journals connecting said blades to said hubs to cause centrifugal force produced by rotation of said propeller to decrease their pitch angle when said pressure is relieved.

19. In combination, a hollow drive shaft, a hub driven by said shaft, blades journalled relative to said hub, a hydraulic piston operatively connected with said blades, means for introducing hydraulic pressure through said hollow drive shaft and piston and onto one side of said piston to turn the blades on their journals to increase their pitch angles, said means comprising a sliding connection between said shaft and said piston, said blades being turned by centrifugal force produced by rotation of said propeller to decrease their pitch angle when said pressure is relieved.

20. An aeronautical engine driven propeller having blades held in low pitch position by centrifugal force acting on the mass of the blades, and controllable means to increase the pitch of the blades in flight, said propeller and means comprising a hydraulic pressure system including a piston and cylinder assembly and a pump driven by the engine, a drive shaft, a hub on the drive shaft, blades mounted on the hub and adapted to be rotated thereon to adjust their pitch, an operative connection between said piston and said blades and a valve for controlling the flow of liquid between said pump and said piston, said piston acting to overcome the pitch changing effect of said centrifugal force and turn the blades to increase their pitch upon an increase of pressure in said cylinder.

21. In combination an engine driven shaft, a propeller having blades operably connected to said shaft, a hydraulic piston operably connected with said blades, means for introducing hydraulic pressure onto one side of said piston to turn the blades to increase their pitch angles, means for controlling said pressure comprising automatic means governed by the speed of rotation of said shaft to increase the hydraulic pressure on the piston with increase of shaft speed and to relieve said hydraulic pressure with decrease of shaft speed, said blades constructed and arranged to be turned by centrifugal force produced by rotation of said propeller to decrease their pitch angle when said pressure is relieved.

22. In combination an engine driven shaft, a propeller having blades operably connected to said shaft, a hydraulically operated piston operably connected with said blades, means for introducing liquid under pressure to one side of said piston to turn the blades to increase their pitch angles, means for governing the flow of liquid to and from said side of said piston comprising automatic means governed by the speed of rotation of said shaft to cause liquid to flow to said piston upon an increase of shaft speed, means connecting said blades with said shaft for preventing radial movement of said blades and causing said blades to be turned and liquid forced from said piston by centrifugal force produced by rotation of said propeller when said automatic means is actuated by a decrease of shaft speed.

23. An aeronautical engine driven propeller comprising a hub, blades journalled relative to said hub, a hydraulically operated piston operatively connected with said blades, a pump operated by said engine, means for conducting liquid under pressure from said pump to said piston, a manually operable valve for controlling the pressure of said liquid on said piston, means connecting said hub and said blades to cause centrifugal force produced by rotation of said propeller to decrease their pitch angle when said pressure is reduced.

24. A variable pitch propeller comprising a plurality of blades, means for rotating said blades, liquid pressure operated means for increasing the pitch of said blades, a governor actuated by rotation of said blades above and below a selected rate of rotation for controlling the operation of said liquid pressure operated means, means for selecting the said rate of rotation, means associated with said blades for determining the axis of pitch changing movement and the pitch changing effect of centrifugal force and causing said blades to be turned and liquid forced from said liquid pressure operated means by the components of centrifugal force lying in planes normal to said axis and produced by rotation of said blades when the governor is actuated by a rate of rotation below the selected rate.

25. A controllable pitch propeller comprising a hub, blades journalled relative to the hub, a liquid pressure operated device operatively connected with said blades, a single conduit leading from said device, means for supplying liquid to said device through said conduit to overcome the action of centrifugal force and turn the blades to increase their pitch angle, and means for draining liquid from said device through said single conduit, said blades constructed and arranged so that centrifugal force produced by rotation of said propeller turns said blades to decrease their pitch angle and forces liquid from said device through said single conduit.

26. A controllable pitch propeller comprising a hub, blades rotatably mounted relative to the hub, and turned in one direction to change their pitch angles, by centrifugal force produced by rotation of the propeller, resilient means acting on said blades to assist said centrifugal force in turning said blades, a piston, means connecting the piston to the blades, and means for introducing liquid under pressure onto one side of said piston to overcome the pitch changing effect of said centrifugal force and said resilient means, and to turn the blades in the opposite direction.

27. In combination, an engine driven shaft, a propeller having blades operably connected to said shaft, an hydraulic piston operably connected with said blades, means for introducing hydraulic pressure onto one side of said piston to turn the blades to increase their pitch angles, means for controlling said pressure, comprising automatic means governed by the speed of rotation of said shaft to increase the hydraulic pressure on the piston with increase of shaft speed and to relieve said hydraulic pressure with decrease of shaft speed, springs opposing movement of said piston by hydraulic pressure, and assisting centrifugal force produced by rotation of said propeller to decrease the blade pitch angle when said pressure is relieved.

28. A variable pitch propeller comprising a plurality of blades, means for rotating said blades, liquid pressure operated means operably connected with said blades for increasing the pitch of said blades, a governor for controlling the operation of said liquid pressure operated means, said governor being actuated by rotation of said blades above a selected rate of rotation to render said liquid pressure operated means operative to increase the pitch of said blades, means adjustable during operation of said propeller for selecting the said rate of rotation, said blades being turned and liquid forced from said liquid pressure operated means by centrifugal force produced by rotation of said blades when the governor is actuated by a rate of rotation below the selected rate.

29. A controllable pitch propeller comprising, in combination, a hub, blades rotatably mounted relative to said hub, and movable in one direction, to change their pitch angles, by centrifugal force produced by rotation of the propeller, liquid pressure operated means, means connecting said liquid pressure operated means to said blades, means for introducing liquid under pressure into said liquid pressure operated means to turn the blades in the opposite direction, resilient means opposing movement of said liquid pressure operated means and assisting said centrifugal force to turn said blades in said one direction.

30. In a controllable pitch propeller, in combination, blades movable to low pitch by centrifugal force produced by rotation of the propeller, liquid pressure operated means, means connecting the liquid pressure operated means to the blades, and means for introducing liquid under pressure onto one side of said liquid pressure operated means, to overcome the action of centrifugal force tending to move the blades to low pitch, and to move the blades in the opposite direction.

31. In a controllable pitch propeller, in combination, a hub, blades journaled relative to said hub, liquid pressure operated means connected with said blades, means for introducing liquid under pressure onto one side of said liquid pressure operated means to turn the blades on their journal, to increase their pitch angle and to hold the blades at said increased pitch, means for relieving said pressure, said blades constructed and arranged so that centrifugal force produced by rotation of said propeller will decrease their pitch angle when said pressure is relieved.

32. A controllable pitch propeller comprising, a hub, blades journaled on the hub, and movable in the direction to decrease their pitch angle only by centrifugal force produced by rotation of the propeller, a piston, means connecting the piston to the blades, and means for introducing liquid under pressure onto one side of said piston to overcome the action of centrifugal force tending to decrease the blade pitch and to turn the blades in the opposite direction.

33. A controllable pitch propeller comprising, in combination, a hub, blades journaled for rotation relative to the hub and movable to and held in low pitch by centrifugal force produced by rotation of the propeller, means for introducing hydraulic pressure onto one side of a piston operably connected with said blades to turn the blades on their journals to increase their pitch angles, and means for relieving said hydraulic pressure to move the blades toward low pitch, said blades being turned by centrifugal force produced by rotation of the propeller when said pressure is relieved.

34. A controllable pitch propeller comprising, in combination, a hub, blades rotatably mounted relative to the hub and movable to low pitch by centrifugal force produced by rotation of the propeller, resilient means acting on said blades to assist said centrifugal force in moving said blades, liquid pressure operated means, means connecting the liquid pressure operated means to the blades, and means for introducing liquid under pressure on one side of said liquid pressure operated means to overcome the action of said resilient means and the action of centrifugal force tending to move the blades to low pitch and to move the blades in the opposite direction.

35. In a controllable pitch propeller, in combination, liquid pressure operated means, propeller blades movable to low pitch by centrifugal force produced by rotation of the propeller when said liquid pressure means is inoperative, means connecting the liquid pressure operated means to the blades, a governor responsive to changes from a selected rate of rotation, and means controlled by said governor for introducing liquid under pressure onto one side of said liquid pressure operated means to overcome the action of centrifugal force tending to move the blades to low pitch and to move the blades in the opposite direction.

FRANK W. CALDWELL.